(12) United States Patent
Chen

(10) Patent No.: US 7,710,615 B2
(45) Date of Patent: May 4, 2010

(54) MULTI-STAGE SCANNING METHOD FOR INCREASING SCANNING SPEED AND ENHANCING IMAGE QUALITY

(75) Inventor: Yen-Cheng Chen, Hsin Chu (TW)

(73) Assignee: Avision Inc. (TW)

( * ) Notice: Subject to any disclaimer, the term of this patent is extended or adjusted under 35 U.S.C. 154(b) by 1044 days.

(21) Appl. No.: 11/409,956

(22) Filed: Apr. 25, 2006

(65) Prior Publication Data
US 2006/0245011 A1 Nov. 2, 2006

(30) Foreign Application Priority Data
Apr. 29, 2005 (TW) .............................. 94113804 A

(51) Int. Cl.
*H04N 1/04* (2006.01)
(52) U.S. Cl. .................. 358/474; 358/497; 358/505; 358/539; 358/450; 358/494; 399/367; 399/364
(58) Field of Classification Search .......... 358/474, 358/496, 486, 497, 501, 505, 450, 539, 1.9, 358/1.2, 1.5, 540; 399/367, 364, 371
See application file for complete search history.

(56) References Cited

U.S. PATENT DOCUMENTS

| | | | | |
|---|---|---|---|---|
| 4,561,771 | A * | 12/1985 | Sugiura | 399/208 |
| 4,595,273 | A * | 6/1986 | Watanabe et al. | 399/204 |
| 4,691,114 | A * | 9/1987 | Hasegawa et al. | 358/474 |
| 5,047,871 | A * | 9/1991 | Meyer et al. | 358/486 |
| 5,051,842 | A * | 9/1991 | Shimazaki | 358/447 |
| 5,513,017 | A * | 4/1996 | Knodt et al. | 358/471 |
| 5,686,960 | A * | 11/1997 | Sussman et al. | 348/218.1 |
| 5,910,114 | A * | 6/1999 | Nock et al. | 600/437 |
| 6,181,378 | B1 * | 1/2001 | Horie et al. | 348/353 |
| 6,348,981 | B1 * | 2/2002 | Walsh | 358/474 |
| 6,353,486 | B1 * | 3/2002 | Tsai | 358/474 |
| 6,822,768 | B1 * | 11/2004 | McCoy | 358/498 |
| 7,099,054 | B2 * | 8/2006 | Shih et al. | 358/474 |
| 7,197,273 | B2 * | 3/2007 | Imai et al. | 399/371 |
| 7,207,644 | B2 * | 4/2007 | Kaburagi | 347/19 |
| 7,349,128 | B2 * | 3/2008 | Hashizume | 358/443 |
| 7,394,578 | B2 * | 7/2008 | Itoh | 358/474 |
| 7,554,704 | B2 * | 6/2009 | Ishizuka | 358/487 |

* cited by examiner

*Primary Examiner*—Negussie Worku

(57) ABSTRACT

In a multi-stage scanning method for increasing a scanning speed and enhancing an image quality, an optical module is firstly moved from a start position to a forward-internal position in a forward direction, and then enabled to scan a first portion of a document to obtain a first image until the module reaches a forward-boundary position. Then, the module is moved from the forward-boundary position to an end position in the forward direction. Next, the module is moved from the end position to a reverse-internal position in a reverse direction, and then enabled to scan a second portion of the document to obtain a second image until the module reaches a reverse-boundary position. Then, the module is moved from the reverse-boundary position to the start position, in the reverse direction, and then stopped. Finally, the first and second images are stitched into a complete image.

17 Claims, 5 Drawing Sheets

MULTI-STAGE SCANNING METHOD FOR INCREASING SCANNING SPEED AND ENHANCING IMAGE QUALITY

BACKGROUND OF THE INVENTION

1. Field of the Invention

The invention relates to a multi-stage scanning method for increasing a scanning speed and enhancing an image quality, and more particularly to a multi-stage scanning method for lengthening an accelerating distance of an optical module in a scanner so as to increase the scanning speed and enhance the image quality.

2. Description of the Related Art

FIG. 1 is a schematic illustration showing a conventional book scanner 1. Referring to FIG. 1, the book scanner 1 has a transparent platen 2 and an inclined plane 4 connected to the transparent platen 2 to form a ridge 3. The ridge 3 supports an opened book 5, and the ridge 3 is far away from a start position P1 of an optical module 10 and close to an end position P6 of the optical module 10.

FIG. 2 shows movement stages of the optical module when the conventional book scanner of FIG. 1 is scanning a book. As shown in FIGS. 1 and 2, the conventional scanning method includes the following steps S101 to S104.

In step S101, the optical module 10 is moved, in a forward direction, from the start position P1 to the end position P6.

In step S102, the optical module 10 is accelerated and moved, in a reverse direction, from the end position P6 to a forward-boundary position P5 such that the optical module 10 has a speed V.

In step S103, the optical module 10 is moved at the speed V such that the optical module 10 can scan the book 5 to obtain an image until it reaches a reverse-boundary position P2.

In step S104, the optical module 10 is moved from the reverse-boundary position P2 back to the start position P1. In this step, the moving speed of the optical module 10 is usually higher than the speed V, such that the time for one scanning process is shortened.

The forward-boundary position P5 in the book scanner 1 is preferably close to the end position P6 such that the contents close to the inner ridge side of the book can be acquired. However, it is more difficult to accelerate the optical module 10 to the speed V if the distance from the position P6 to the position P5 is shorter. In this condition, a motor with a larger output torsional force has to be used to move the optical module 10, and the cost is thus high. Alternatively, even though the motor with the larger torsional force is used to move the optical module 10, the optical module 10 still cannot be moved at the stable speed V after the position P5 and the image quality is inevitably deteriorated if the distance from the position P6 to the position P5 is too short. In other words, if the scanning speed has to be increased without changing the motor, the period of time the optical module 10 is kept unstable will be longer and the image quality of the document edge is thus influenced.

FIG. 3 shows movement stages of the optical module when the conventional book scanner of FIG. 1 is scanning a document. The movement stages are also suitable for the typical flatbed scanner for scanning the document, so the conventional flatbed scanner will be no longer depicted and the reference may be made according to FIG. 1.

As shown in FIGS. 3 and 1, the conventional scanning method includes the following steps.

In step S201, the optical module 10 is accelerated and moved, in a forward direction, from a start position P1 to a reverse-boundary position P2 such that the optical module 10 has a speed V.

In step S202, the optical module 10 is enabled to scan a document at the speed V to obtain an image until the optical module 10 reaches a forward-boundary position P5.

In step S203, the optical module 10 is moved from the forward-boundary position P5 and stopped at an end position P6.

In step S204, the optical module 10 is moved from the end position P6 back to the start position P1 and then stopped. Because no scanning function is performed in this step, the speed of the optical module 10 can be increased to shorten the time for one scanning stroke.

However, the distance from the position P1 to the position P2 is gradually shortened in order to reduce the size of the scanner. Thus, the problem of insufficient accelerating distance, which is encountered in the scanning process of FIG. 2, still exists.

SUMMARY OF THE INVENTION

It is therefore an object of the invention to provide a multi-stage scanning method for increasing a scanning speed and enhancing an image quality, wherein the higher scanning speed and image quality may be obtained by lengthening an accelerating distance of an optical module in a scanner.

To achieve the above-identified object, the invention provides a multi-stage scanning method for increasing a scanning speed and enhancing an image quality. The method includes the steps of: moving an optical module, in a forward direction, from a start position to a forward-internal position, and then enabling the optical module to scan a first portion of a document to obtain a first image until the optical module reaches a forward-boundary position; moving the optical module, in the forward direction, from the forward-boundary position to an end position and then stopping the optical module; moving the optical module, in a reverse direction which is reverse to the forward direction, from the end position to a reverse-internal position, and then enabling the optical module to scan a second portion of the document to obtain a second image until the optical module reaches a reverse-boundary position, wherein the forward-boundary position and the reverse-boundary position define a scan range of the document in the forward direction and the reverse direction; moving the optical module from the reverse-boundary position in the reverse direction and then stopping the optical module; and stitching the first and the second images into a complete one corresponding to the document.

The invention also provides a multi-stage scanning method for increasing a scanning speed and enhancing an image quality. The method includes the steps of: (a) moving an optical module, in a forward direction, from a start position to a reverse-boundary position and then enabling the optical module to scan a first portion of a document to obtain a first image until the optical module reaches a reverse-internal position; (b) moving the optical module, in a reverse direction which is reverse to the forward direction, from the reverse-internal position to the start position and then stopping the optical module; (c) moving the optical module, in the forward direction, to a forward-internal position and then enabling the optical module to scan a second portion of the document to obtain a second image until the optical module reaches a forward-boundary position, wherein the forward-boundary position and the reverse-boundary position define a scan range of the document along the forward direction and the reverse direction; and (d) stitching the first image and the second image into a complete image corresponding to the document.

DETAILED DESCRIPTION OF THE INVENTION

Figure 1:
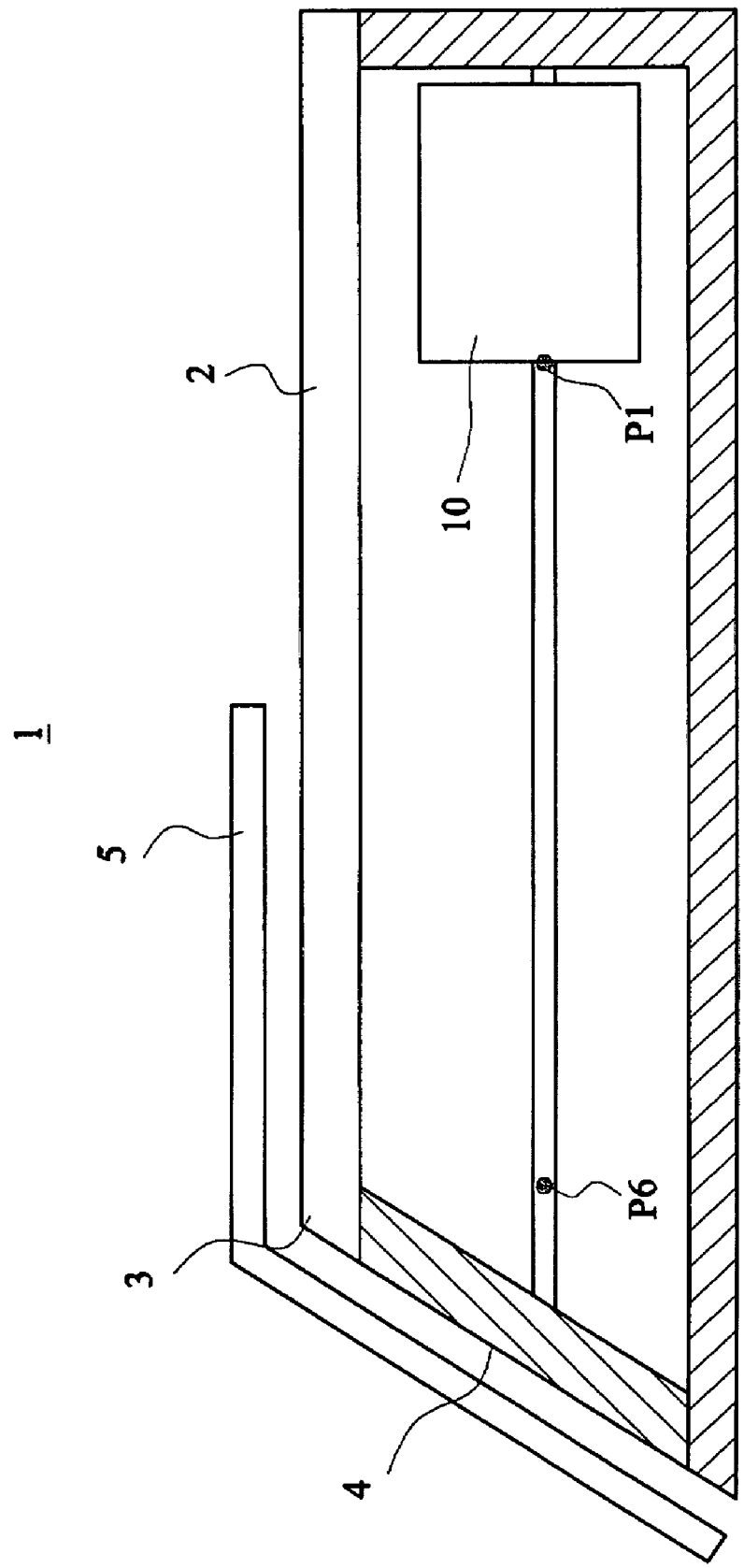
FIG. 1 is a schematic illustration showing a conventional book scanner.
Figure 2:
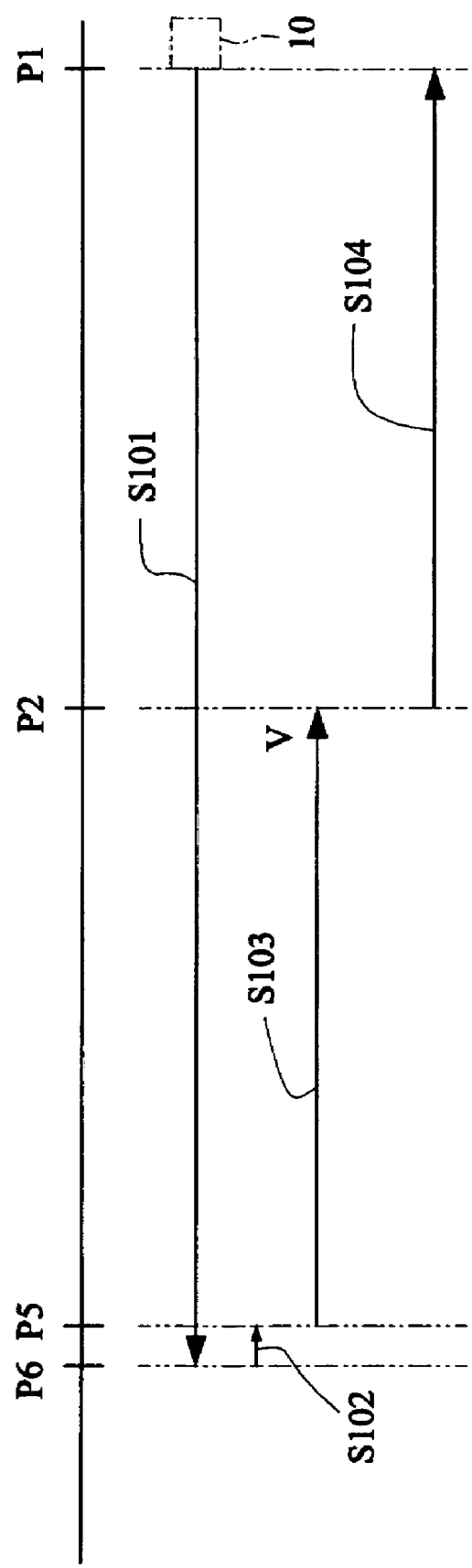
FIG. 2 shows movement stages of an optical module when the conventional book scanner of FIG. 1 is scanning a book.
Figure 3:
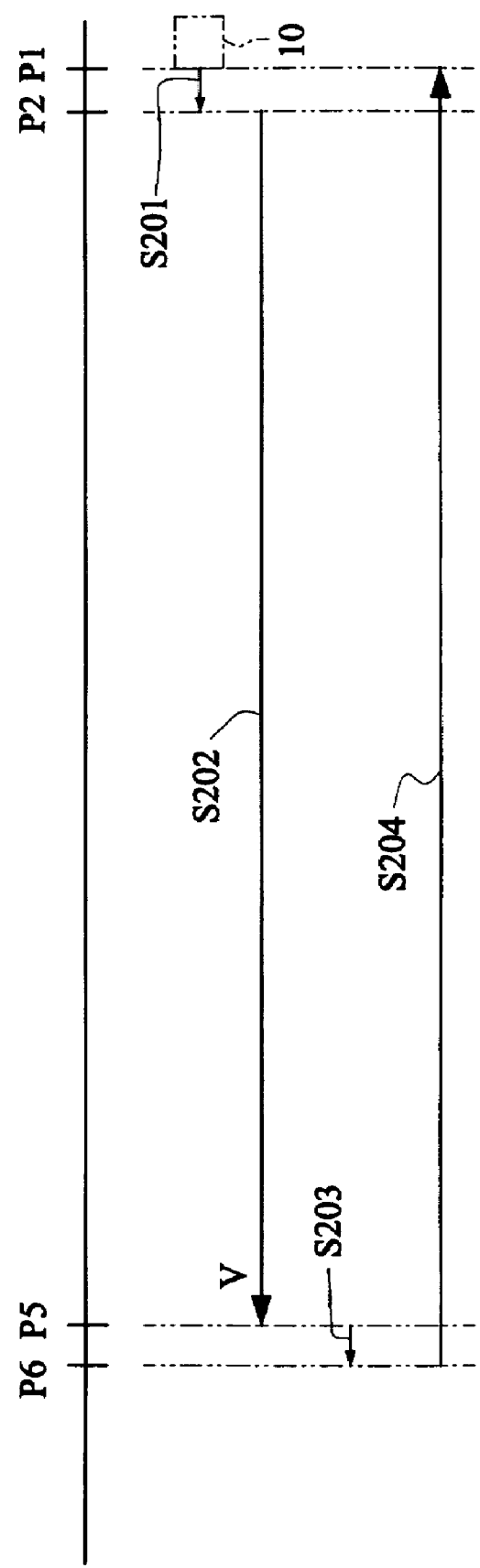
FIG. 3 shows movement stages of the optical module when the conventional book scanner of FIG. 1 is scanning a document.
Figure 4:
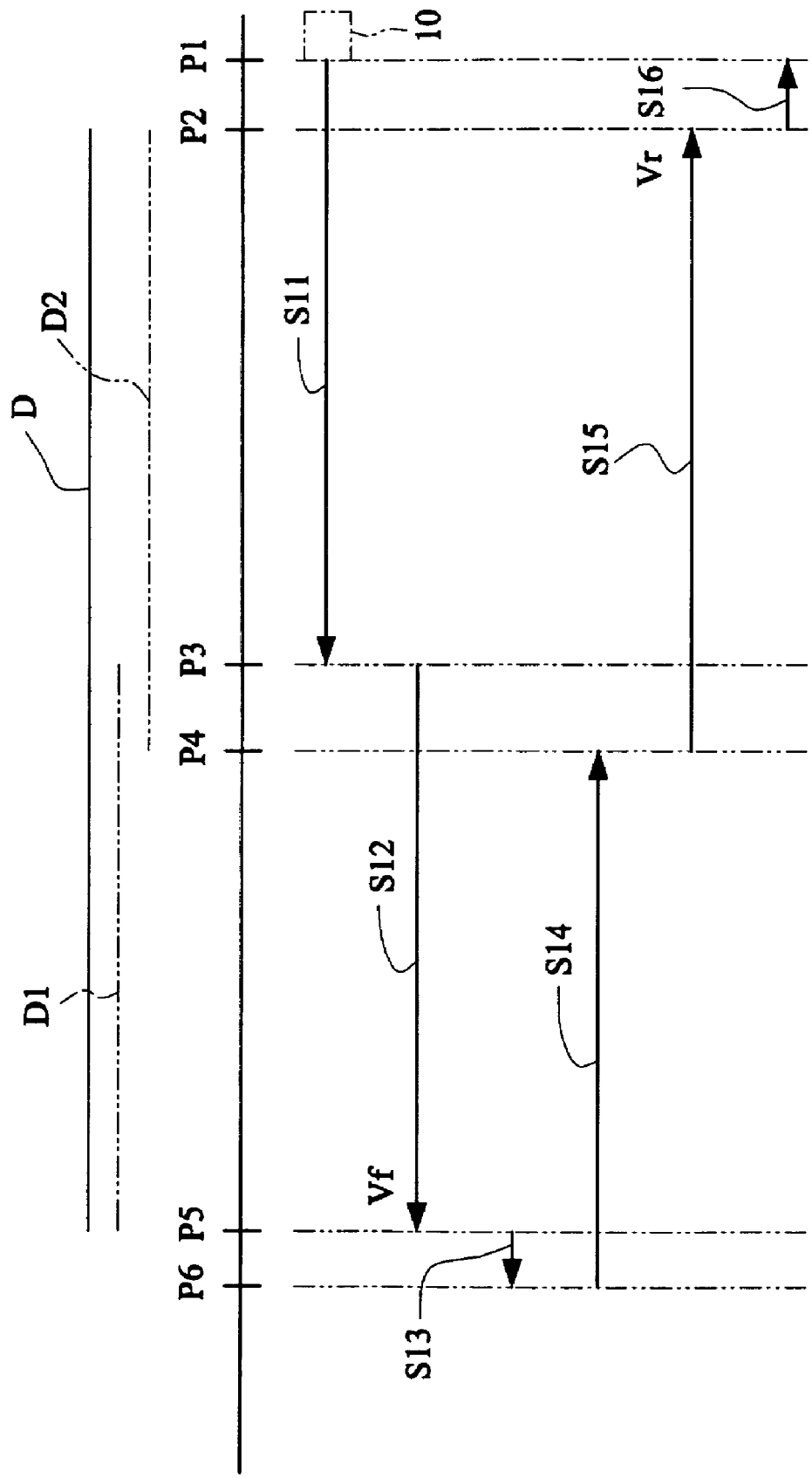
FIG. 4 shows movement stages of an optical module in a multi-stage scanning method according to a first embodiment of the invention.

FIG. 4 shows movement stages of an optical module in a multi-stage scanning method according to a first embodiment of the invention. As shown in FIGS. 4 and 1, the multi-stage scanning method of this embodiment is applied to a book scanner 1. The book scanner 1 has a transparent platen 2 and an inclined plane 4 connected to the transparent platen 2 to form a ridge 3. The ridge 3 supports an opened book 5 (or referred to as a document D). The ridge 3 is far away from a start position P1 of an optical module 10 and close to an end position P6 of the optical module 10. This scanning method includes the following steps.

In step S11, the optical module 10 is moved, in a forward direction, from the start position P1 to a forward-internal position P3. At this moment, the optical module 10 is accelerated to a forward speed Vf within a distance from the start position P1 to the forward-internal position P3, wherein the acceleration may be constant or variable.

In step S12, the optical module 10 is enabled to scan a first portion D1 of the document D to obtain a first image until the optical module 10 reaches a forward-boundary position P5. Usually, the optical module 10 is moved at a constant forward speed Vf from the position P3 to the position P5 to scan the first portion D1 of the document D and thus to keep the image quality stable.

In step S13, the optical module 10 is moved, in the forward direction, from the forward-boundary position P5 to the end position P6 and then stopped.

In step S14, the optical module 10 is moved, in a reverse direction which is reverse to the forward direction, from the end position P6 to a reverse-internal position P4. Typically, the optical module 10 is accelerated to a reverse speed Vr within a distance from the end position P6 to the reverse-internal position P4, and the acceleration may be constant or variable.

In step S15, the optical module 10 is enabled to scan a second portion D2 of the document D to obtain a second image until the optical module 10 reaches a reverse-boundary position P2. It is to be noted that the forward-boundary position P5 and the reverse-boundary position P2 define a scan range (i.e., leading and trailing edges) of the document D along the forward direction and the reverse direction, and the optical module 10 is usually moved at a constant speed from the position P4 to the position P2 such that the second portion D2 of the document D is scanned at the reverse speed Vr and the image quality is kept stable.

In step S16, the optical module 10 is moved, in the reverse direction, from the reverse-boundary position P2 and then stopped. In this embodiment, the optical module 10 is stopped at the start position P1. However, it is also possible to stop the optical module 10 between the positions P1 and P2, and the optical module 10 is moved back to the start position P1 when the optical module 10 is started at the next time. The reverse-internal position P4 and the forward-internal position P3 are located between the forward-boundary position P5 and the reverse-boundary position P2.

The last step is an image processing step for stitching the first and the second images into a complete one corresponding to the document D. The first portion D1 and the second portion D2 are preferably partially overlap with each other for the purposes of image stitching and mechanical error elimination.

According to the scanning method of this embodiment, the distance from P1 to P3 is sufficient for the optical module 10 to be accelerated to the forward speed Vf during the period, in which the optical module 10 is moved from the start position P1 to the end position P6, and the optical module 10 can scan the first portion D1 of the document D at the forward speed Vf stably. The distance from P6 to P4 is sufficient for the optical module 10 to be accelerated to the reverse speed Vr during the period, in which the optical module 10 is moved from the end position P6 to the start position P1, and the optical module 10 can scan the second portion D2 of the document D at the reverse speed Vr. Thus, the reverse speed Vr and the forward speed Vf may be the suitable highest scanning speeds such that the scanning speed is increased and the image quality is enhanced. In addition, since the distance from the position P1 to the position P2 and the one from the position P5 to the position P6 are not the main factors of influencing the forward speed Vf and the reverse speed Vr, the distances can be possibly shortened such that the size of the scanner is reduced. Therefore, the drawbacks of the lower scanning speed, the poor image quality and the large size encountered in the prior art can be effectively solved.

Figure 5:
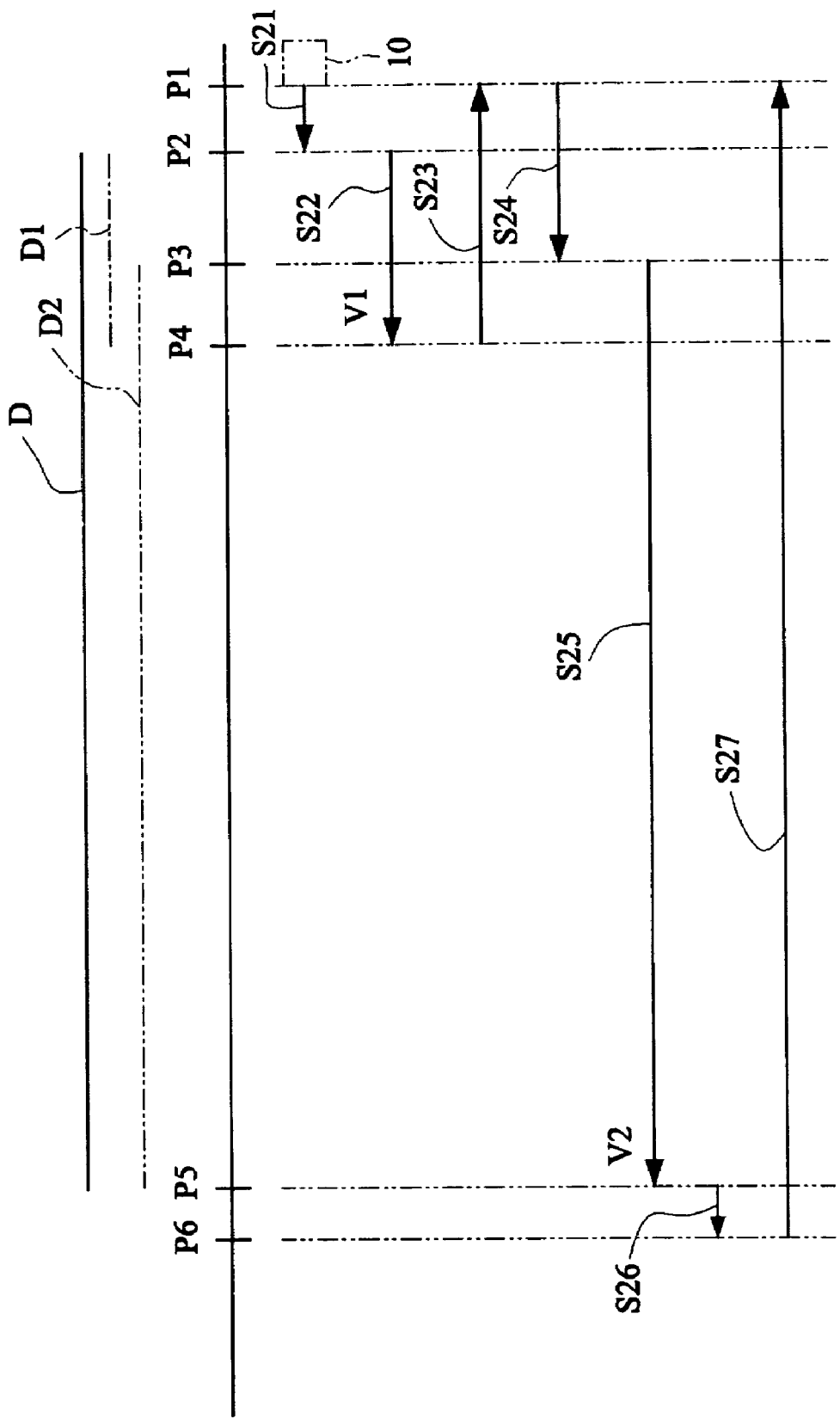
FIG. 5 shows movement stages of an optical module in a multi-stage scanning method according to a second embodiment of the invention.

FIG. 5 shows movement stages of an optical module in a multi-stage scanning method according to a second embodiment of the invention. As shown in FIGS. 5 and 1, the multi-stage scanning method of this embodiment is applied to a flatbed scanner and includes the following steps.

In step S21, an optical module 10 is moved, in a forward direction, from a start position P1 to a reverse-boundary position P2. The optical module 10 is accelerated to a first speed V1 within a distance from the start position P1 to the reverse-boundary position P2, wherein the acceleration can be constant or variable.

In step S22, the optical module 10 is enabled to scan a first portion D1 of a document D to obtain a first image until the optical module 10 reaches a reverse-internal position P4. In this embodiment, the optical module 10 scans the first portion D1 of the document D at the first speed V1.

In step S23, the optical module 10 is moved, in a reverse direction which is reverse to the forward direction, from the reverse-internal position P4 to the start position P1 and then stopped. Typically, the optical module 10 is stopped at the start position P1. However, the optical module 10 may be stopped between the positions P1 and P2.

In step S24, the optical module 10 is moved, in the forward direction, to a forward-internal position P3. In this embodiment, the optical module 10 is accelerated to a second speed V2 within a distance from the start position P1 to the forward-internal position P3, wherein the acceleration may be constant or variable.

In step S25, the optical module 10 is enabled to scan a second portion D2 of the document D to obtain a second image until the optical module 10 reaches a forward-boundary position P5. The forward-boundary position P5 and the reverse-boundary position P2 define a scan range of the document D along the forward direction and the reverse direction. In this embodiment, the optical module 10 scans the second portion D2 of the document D at the second speed V2, which may be higher than the first speed V1 such that the scan time is shortened.

In step S26, the optical module 10 is moved, in the forward direction, from the forward-boundary position P5 to an end position P6 and then stopped.

In step 27, the optical module 10 is moved from the end position P6 in the reverse direction and then stopped. Typically, the optical module 10 is stopped at the start position P1. However, the optical module 10 may also be stopped at a location between the positions P6 and P1 according to the reasons similar to those of the first embodiment.

The last step is an image processing step for stitching the first and the second images into a complete one corresponding to the document D. The first portion D1 and the second portion D2 are preferably partially overlap with each other for the purposes of image stitching and mechanical error elimination.

According to the scanning method of this embodiment, the first speed V1 of the optical module 10 is not too high because the distance from the position P1 to the position P2 is short. It inevitably takes a relative long time if the whole image of the document is scanned at the first speed V1. Thus, the first portion D1 of the document D corresponding to the position P2 to the position P4 is scanned at the first speed V1 in this embodiment. Thereafter, the optical module 10 is accelerated to the higher second speed V2 within the distance from the position P1 to the position P3. Then, the optical module 10 moving at the second speed V2 scans the second portion D2 of the document D. Sacrificing the scan time for the optical module to scan a smaller portion of the document at the lower speed can increase the scan speed for the optical module to scan a larger portion of the document. Thus, the time for the overall scanning process can be effectively shortened. Because the accelerating distance for the optical module 10 to be accelerated to the second speed V2 is long, the second speed V2 can be possibly increased without influencing the stability of the optical module 10, and the overall image quality is relatively enhanced. In addition, the distance from P1 to P2 and the distance from P5 to P6 are not the main factors for influencing the first speed V1 and the second speed V2, so the distances can be possibly shortened and the size of the scanner can be reduced. Therefore, the drawbacks of the lower scanning speed, the poor image quality and the large size encountered in the prior art can be effectively solved.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A multi-stage scanning method of a scanner for increasing a scanning speed and enhancing an image quality, comprising the steps of:

moving an optical module, in a forward direction, from a start position to a forward-internal position, and then enabling the optical module to scan a first portion of a document to obtain a first image until the optical module reaches a forward-boundary position;

moving the optical module, in the forward direction, from the forward-boundary position to an end position and then stopping the optical module;

moving the optical module, in a reverse direction which is reverse to the forward direction, from the end position to a reverse-internal position, and then enabling the optical module to scan a second portion of the document to obtain a second image until the optical module reaches a reverse-boundary position, wherein the forward-boundary position and the reverse-boundary position define a scan range of the document in the forward direction and the reverse direction, wherein the reverse-internal position and the forward-internal position are located between the forward-boundary position and the reverse-boundary position;

moving the optical module from the reverse-boundary position in the reverse direction and then stopping the optical module; and stitching the first image and the second image into a complete image corresponding to the document.

2. The method according to claim 1, wherein the optical module is stopped at the start position after the optical module is moved from the reverse-boundary position in the reverse direction.

3. The method according to claim 1 being applied to a book scanner, which has a transparent platen and an inclined plane connected to the transparent platen to form a ridge for supporting an opened book, wherein the ridge is far away from the start position and close to the end position.

4. The method according to claim 1, wherein the optical module scans the first portion and the second portion of the document at a constant speed.

5. The method according to claim 1, wherein the first portion and the second portion partially overlap with each other.

6. The method according to claim 1, wherein the optical module is accelerated to a forward speed within a distance from the start position to the forward-internal position and scans the first portion of the document at the forward speed.

7. The method according to claim 1, wherein the optical module is accelerated to a reverse speed within a distance from the end position to the reverse-internal position, and scans the second portion of the document at the reverse speed.

8. A multi-stage scanning method of a scanner for increasing a scanning speed and enhancing an image quality, comprising the steps of:

(a) moving an optical module, in a forward direction, from a start position to a reverse-boundary position and then enabling the optical module to scan a first portion of a document to obtain a first image until the optical module reaches a reverse-internal position;

(b) moving the optical module, in a reverse direction which is reverse to the forward direction, from the reverse-internal position to the start position and then stopping the optical module;

(c) moving the optical module, in the forward direction, to a forward-internal position and then enabling the optical module to scan a second portion of the document to obtain a second image until the optical module reaches a forward-boundary position, wherein the forward-boundary position and the reverse-boundary position define a scan range of the document in the forward direction and the reverse direction, and the reverse-internal position and the forward-internal position are located between the forward-boundary position and the reverse-boundary position; and (d) stitching the first and the second images into a complete one corresponding to the document.

9. The method according to claim 8, wherein in the step (b), the optical module is stopped at the start position.

10. The method according to claim 8, further comprising, after the step (c), the step of:

moving the optical module, in the forward direction, from the forward-boundary position to an end position and then stopping the optical module.

11. The method according to claim 8, further comprising, after the step (c), the steps of:

moving the optical module, in the forward direction, from the forward-boundary position to an end position and then stopping the optical module; and moving the optical module from the end position in the reverse direction and then stopping the optical module.

12. The method according to claim 11, wherein the optical module is moved from the end position in the reverse direction and then stopped at the start position.

13. The method according to claim 8, wherein the optical module scans the first portion and the second portion of the document at a constant speed.

14. The method according to claim 8, wherein the first portion and the second portion partially overlap with each other.

15. The method according to claim 8, wherein the optical module is accelerated to a first speed within a distance from the start position to the reverse-boundary position and scans the first portion of the document at the first speed.

16. The method according to claim 15, wherein the optical module is accelerated to a second speed within a distance from the start position to the forward-internal position and scans the second portion of the document at the second speed, which is higher than the first speed.

17. The method according to claim 8, wherein the optical module is accelerated to a second speed within a distance from the start position to the forward-internal position and scans the second portion of the document at the second speed.

\* \* \* \* \*